United States Patent Office 3,392,773
Patented July 16, 1968

3,392,773
PNEUMATIC TIRE
Alvin William Warren and Frederick George Troppe, Akron, Ohio, assignors to The Firestone Tire & Rubber Company, Akron, Ohio, a corporation of Ohio
Filed Nov. 5, 1965, Ser. No. 506,455
7 Claims. (Cl. 152—354)

ABSTRACT OF THE DISCLOSURE

This disclosure relates to a radial ply tire containing an improved bead construction whereby the bead area of the tire is more flexible. This construction comprises providing the bead area with a soft, low modulus rubber compound that extends from immediately adjacent the bead bundle to a point radially beyond the edge of any inextensible ply that occurs in the lower sidewall area. This is implemented by using the soft, lower modulus rubber compound as the bead filler and a ply edge gum strip for the above cited edge.

---

This invention relates to radial ply pneumatic tires, and specifically to the bead and lower sidewall portion of the carcass.

These tires may be built and cured with standard equipment. Separations occurring in the lower sidewall area have been a persistent problem in this type of tire that has delayed its commercial acceptance. In the standard constructions of this tire, the terminal edges of the body ply are each anchored around a wire bead with said ply edges being located either in the bead area or the lower sidewall area. In both cases a wire reinforce ply is added to stiffen the bead; it being anchored around the bead and radially outwardly of said body ply. When the ply edge is located in the bead area, the wire reinforce has its terminal edge in the lower sidewall area; likewise, when the ply edge is located in the lower sidewall area, the wire reinforce has its edge in the bead area. In all cases where wire ends are in the flexible lower sidewall area, whether it be the body ply or the reinforce ply, a stress point occurs and cracking or a separation develops at said ends and causes failure of the tire.

It is the object of this invention to provide a radial ply tire which is free from cracking and separations in the lower sidewall area.

Past constructions have all been designed to provide a stiff bead and lower sidewall area; thereby, it was thought, eliminating the working or flexing done by these wire ends and lessening the occurrence of separations. To this end wire chafers and reinforces were incorporated and hard, high modulus rubber compounds were employed; as examples see U.S. 3,052,275; U.S. 3,172,445; and Great Britain 995,645. These constructions all show efforts to stiffen the bead and lower sidewall area with chafers, reinforces and/or hard, high modulus compounds; that is, at least 65 and preferably 75 to 85 durometer.

However, the inventors found that the separations and cracking at the wire ends in the lower sidewall area persisted even with the stiffer constructions. The inventors have finally solved this cracking problem by constructing the bead in a manner contrary to the present practice; that is by making a more flexible bead and lower sidewall area. This was done by enveloping the wire ends in a relatively soft, low modulus rubber compound, and using the same compound as the bead filler. With the hard, high modulus compounds, even though designed to dampen flexing, flexing still occurred. This flexing met concentrated resistance by said high modulus compound; therefore, causing the cracking and/or separations at the wire ends. In the novel construction of this invention, the bead and lower sidewall and wire ends are actually permitted to flex more than usual by the presence of the soft, low modulus compound. This flexing is not met by concentrated resistance, but is distributed over a large volume of rubber by the low modulus compound. The vulnerable wire ends can be described as floating in the soft compound. The cracking and separation are thereby eliminated because the stress or working is transmitted to a larger area.

Figure 1:
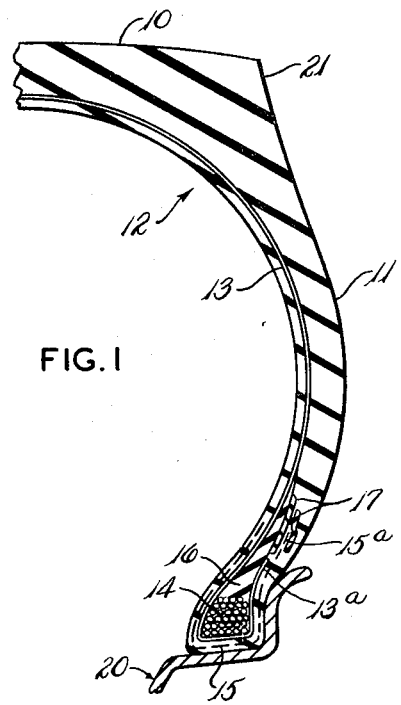
FIGURE 1 is a partial cross-sectional view of a tire embodying this invention.

Referring to FIGURE 1, 20 represents a tire rim; the tire 21 contains tread 10, sidewall 11, and carcass 12. Included in the carcass 12 is ply 13 which is composed of substantially parallel cords of inextensible material disposed radially of the tire axle; that is, at an angle of 90° to the tread circumferential center line. Such inextensible material may be steel, steel cables, glass or the like, but preferably steel cable. Said ply is anchored around bead 14 by being wrapped around said bead and the terminal ply edge 13a is placed radially outwardly of said bead in the bead area. Likewise wrapped around bead 14 is a relatively narrower reinforce ply 15 so that ply edge 13a is in the flexible lower sidewall tains substantially parallel cords of inextensible material. The outwardly terminal edge 15a of said reinforce is placed in the flexible lower sidewall area. Bead filler 16 is placed radially above and immediately adjacent to bead 14, being radially outward of ply 13 and radially inward of ply end 13a and reinforce end 15a. Two gum strips 17 are placed, one radially inward and the other radially outward, so that they envelop the edge 15a of reinforce 15.

Figure 2:
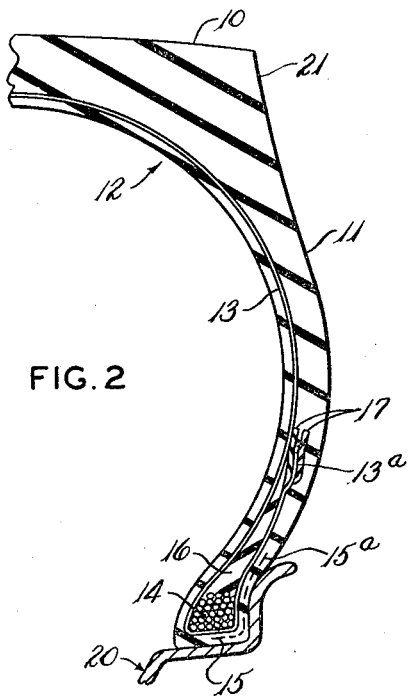
FIGURE 2 is a partial cross-sectional view of a tire with a modified form of this invention.

FIGURE 2 is another embodiment of this invention in which the ply 13 extends radially higher than reinforce 15 so that ply edge, 13a, is in the flexible lower sidewall area while the reinforce edge 15a is not. In this embodiment the ply edge 13a is enveloped by the two gum strips 17.

Figure 3:
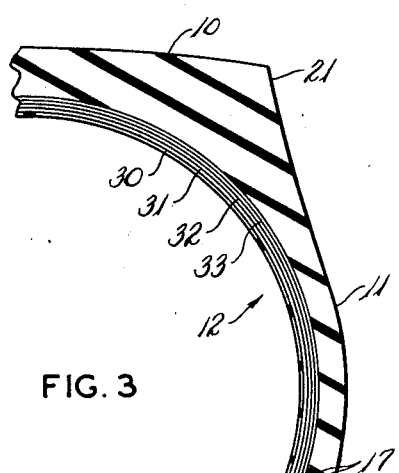
FIGURE 3 is a partial cross-sectional view of a tire with a modified form of this invention when the tire's carcass is comprised of layers of synthetic fabric.

FIGURE 3 is still another embodiment of this invention. In this embodiment the carcass is comprised of synthetic fabric, as opposed to the inextensible material of ply 13 in FIGURES 1 and 2. The synthetic fabric may be rayon, nylon, Dacron, or the like. When said synthetic material is used in the carcass, it is customary in the art to use multiple plies instead of one. In FIGURE 3, 30, 31, 32 and 33 represent said synthetic fabric plies containing substantially parallel cords disposed at an angle of 90° to the tread circumferential center line and having terminal edges 30a, 31a, 32a and 33a, respectively, located in the bead area. Reinforce ply 15 is placed around the bead 14 and radially outwardly of said carcass plies with its terminal edge 15a being located in the flexible lower sidewall area. Again bead filler 16 is placed radially above and immediately adjacent to bead 14 and radially outward of plies 30, 31, 32, and 33 and radially inward of ply edges 30a, 31a, 32a, and 33a. Reinforce edge 15a is enveloped by gum strips 17, as before described. FIGURE 3 discloses four plies of synthetic fabric but is not intended as a limitation on the number of said plies. It is the custom in the art to vary the number of said plies depending on the size of the tire.

As has been stated, it has been found that the cracking and separations occur when wire ends (whether ply or reinforce) are located in the high flex area (15a in FIGURES 1 and 3, and 13a in FIGURE 2) whereas no such problems occur in the relatively lower flexing area (13a in FIGURE 1 and 15a in FIGURE 2).

In all embodiments the reinforce ply 15 is of an inextensible material, such as steel, steel cable, glass, etc., but preferably steel cable.

The bead filler 16 and gum strips 17, used in all embodiments consists of a rubber compound having a Shore A hardness between 45 and 55, preferably substantially about 50; and a modulus at 200% elongation between 450 pounds per square inch (p.s.i.) and 900 p.s.i., preferably substantialy about 550 p.s.i.

Table I is an example, without limiting, of such a compound:

*Table I*

| | Parts |
|---|---|
| NR | 100.0 |
| HAF | 25.0 |
| Stearic acid | 2.0 |
| Zinc oxide | 7.5 |
| Oil | 2.5 |
| Antioxidant | 3.0 |
| Accelerator | 0.8 |
| Sulfur | 3.0 |
| Total | 143.8 |

The vast improvement provided by the construction of this invention is apparent from the results obtained on indoor test drums. This test consists of running a tire under highly overloaded conditions, thereby causing a high deflection of the tire sidewall and extreme flexing in this sidewall area, on a large steel drummed test machine, as is commonly used in the art. Several conventional tires of the construction shown in FIGURE 1 having a conventional hard, high modulus gum strips 17 and bead fillers 16 (that is approximately 80 durometer and 2600 p.s.i. at 200% elongation modulus) averaged 3500 miles before failure due to cracking and separation at the reinforce end 15a. Whereas, the tire of this invention, FIGURE 1 with the gum strips 17 and bead filler 16, having a hardness of 50 and a modulus of 550 p.s.i. at 200% elongation, completed the test *without failure;* that is the full 10,000 miles.

While certain embodiments of this invention have been shown, it will be apparent to those skilled in the art that various changes may be made without departing from the scope of the invention.

We claim:
1. A pneumatic tire of the radial type having a carcass, a tread, two sidewalls and two annular beads, in which the carcass comprises substantially parallel inextensible cords disposed at an angle of 90° to the circumferential tread center line, and each bead has a ply of substantially parallel inextensible cords wrapped around it with a terminal edge of said ply disposed in the portion of the sidewall area adjacent to and radially outwardly of said bead, and a soft, low modulus rubber compound having a Shore A hardness between 45 and 55 and a modulus at 200% elongation between 450 and 900 p.s.i. extending radially outwardly from immediately adjacent said bead between said terminal ply edge and said carcass and enveloping said terminal ply edge, whereby the bead and lower sidewall area of the tire are more flexible to inhibit separations at the terminal edge of said inextensible ply in the lower sidewall area.

2. The tire of claim 1 wherein said soft, low modulus rubber compound has a Shore A hardness of substantially 50 and a modulus at 200% elongation of substantially 550 p.s.i.

3. The tire of claim 1 wherein said inextensible cord is wire.

4. The tire of claim 1 wherein said ply is a bead reinforcing ply.

5. The tire of claim 1 wherein said ply is a body ply.

6. The tire of claim 1, wherein said soft, low modulus rubber compound is in the form of a bead filler and ply edge gum strips.

7. A tire of the radial type having a tread and two sidewalls and:
   (1) body plies of substantially parallel synthetic cords disposed at an angle of 90° to the circumferential tread center line,
   (2) two annular beads each enveloped by a terminal edge of one of said plies with said ply edges disposed radially outwardly of said plies,
   (3) two bead reinforcing plies of substantially parallel inextensible cords, each disposed radially outwardly of said body plies and each wrapped around one of said beads with a terminal edge of each of said reinforcing plies located in the flexible sidewall area adjacent to and radially outwardly of said bead, and
   (4) two soft, low modulus bead fillers having a Shore A hardness between 45 and 55 and a modulus at 200% elongation between 450 and 900 p.s.i., each said filler located immediately adjacent to and radially outwardly of one of said annular beads and separating said body plies from their terminal edges and from the said terminal edge of the said bead reinforcing plies, and
   (5) gum strips of said soft low modulus rubber compound enveloping said terminal edges of said bead reinforcing plies, so that said soft, low modulus rubber compound extends from said bead to a point radially beyond said terminal ply edge of said bead reinforcing plies whereby the bead and lower sidewall areas of the tire are more flexible to inhibit separations at the terminal edge of said bead reinforcing plies.

References Cited

UNITED STATES PATENTS

| 2,452,998 | 11/1948 | Cuthbertson | 152—354 |
| 3,111,976 | 11/1963 | Delobelle | 152—362 |
| 3,244,215 | 4/1966 | Beidge et al. | 152—362 |

FOREIGN PATENTS

| 1,369,464 | 7/1964 | France. |

ARTHUR L. LA POINT, *Primary Examiner.*

Y. P. SCHAEVITZ, S. T. KRAWCZEWICZ,
*Assistant Examiners.*

UNITED STATES PATENT OFFICE
CERTIFICATE OF CORRECTION

Patent No. 3,392,773

July 16, 1968

Alvin William Warren et al.

It is certified that error appears in the above identified patent and that said Letters Patent are hereby corrected as shown below:

Column 2, line 30, "so that ply edge 13a is in the flexible lower sidewall" should read -- which is radially outwardly of said ply 13 and con- ---.

Signed and sealed this 2nd day of December 1969.

(SEAL)
Attest:

Edward M. Fletcher, Jr.
Attesting Officer

WILLIAM E. SCHUYLER, JR.
Commissioner of Patents